US008718168B2

(12) United States Patent  
Jeong et al.

(10) Patent No.: US 8,718,168 B2  
(45) Date of Patent: May 6, 2014

(54) METHOD OF TRANSMITTING UPLINK DM-RS MULTIPLEXED WITH DATA IN UPLINK MIMO TRANSMISSION

(75) Inventors: Byung Jang Jeong, Daejeon (KR); Bangwon Seo, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 13/010,426

(22) Filed: Jan. 20, 2011

(65) Prior Publication Data

US 2011/0176632 A1    Jul. 21, 2011

(51) Int. Cl.  
*H04B 7/02*    (2006.01)

(52) U.S. Cl.  
USPC ............ 375/267; 375/260; 375/295; 375/296

(58) Field of Classification Search  
USPC .................................................. 375/260, 267  
See application file for complete search history.

(56) References Cited

U.S. PATENT DOCUMENTS

2010/0002800 A1*  1/2010  Kim et al. ...................... 375/295  
2010/0296465 A1*  11/2010  Hooli et al. .................... 370/329

OTHER PUBLICATIONS

3GPP TR 36.912 V9.1.0 "Feasibility study for Further Advancements for E-UTRA (LTE-Advanced) (Release 9)", Dec. 2009.*

3GPP TSG RAN WG1 #55bis R1-090364, "Flexible Data and Reference Multiplexing for LTE-Advanced Uplink" Jan. 12-16, 2009.*  
3GPP TSG RAN WG1 #59bis, R1-100100, "UL TPC in Re1.10," Samsung;Valencia, Spain, Jan. 19-23, 2010 (4 pages).*  
Qualcomm Europe, "Flexible Data and Reference Multiplexing for LTE-Advanced Uplink," 3GPP TSG-RAN WG1 #56bis, R1-091472 (2009).

* cited by examiner

*Primary Examiner* — Shuwang Liu  
*Assistant Examiner* — Ross Varndell  
(74) *Attorney, Agent, or Firm* — Nelson Mullins Riley & Scarborough LLP (57) ABSTRACT

Provided is a multi-layer transmission method of multiplexing and transmitting data and a demodulation reference signal (DM-RS) sequence in an uplink digital Fourier transform-spread-orthogonal frequency division multiplexing (DFT-S-OFDM) transmission employing multiple-input multiple-output (MIMO). The method includes allocating one DM-RS sequence as a DM-RS sequence of a first transmission layer for uplink transmission; allocating a DM-RS sequence whose cyclic shift (CS) value having the same sequence as the DM-RS sequence of the first transmission layer is configured to differ from that of the DM-RS sequence as a DM-RS sequence of a second transmission layer; and multiplexing layer-specific data and the layer-specific DM-RS sequences according to each of the first and second transmission layers. Accordingly, an RS can be transmitted in more OFDM symbols of a slot or subframe without an increase in overhead. Consequently, it is possible to satisfy requirements of LTE-advanced that a high frequency spectrum and a high mobile velocity should be supported, and transmit and receive a DM-RS multiplexed with data while maintaining orthogonality.

4 Claims, 6 Drawing Sheets

METHOD OF TRANSMITTING UPLINK DM-RS MULTIPLEXED WITH DATA IN UPLINK MIMO TRANSMISSION

CLAIM FOR PRIORITY

This application claims priority to Korean Patent Applications No. 2010-0005014 filed on Jan. 20, 2010 and No. 2011-0002634 filed on Jan. 11, 2011 in the Korean Intellectual Property Office (KIPO), the entire contents of which are hereby incorporated by reference.

BACKGROUND

1. Technical Field

Example embodiments of the present invention relate in general to uplink demodulation reference signal (DM-RS) transmission, and more particularly, to a transmission method of multiplexing data and a DM-RS in one orthogonal frequency division multiplexing (OFDM) symbol while maintaining a low cubic metric (CM) and enabling multi-layer transmission of the multiplexed data and DM-RS in a digital Fourier transform (DFT)-spread (S)-OFDM technique, which is an uplink access scheme of 3rd Generation Partnership Project (3GPP) long term evolution (LTE)-advanced.

2. Related Art

The DFT-S-OFDM technique can efficiently make use of a power amplifier due to an excellent characteristic of a low CM or an equivalently low peak-to-average power ratio (PAPR). This becomes a significant advantage when coverage and the price of a power amplifier are issues.

To be specific, DFT-S-OFDM has a similar structure to OFDM, making it robust against a multipath channel, and also solves a problem of the conventional OFDM that a PAPR increases due to an inverse fast Fourier transform (IFFT) operation. In this way, DFT-S-OFDM reduces a PAPR of a final transmission signal by about 2 to 3 dB, thereby enabling a more efficient power amplifier (PA) to be used in a terminal. In the structure of single carrier frequency division multiple access (SC-FDMA), a load of a terminal is reduced as much as possible, and the reduced load is shifted to a base station.

Due to such an advantage, DFT-S-OFDM has been adapted as an uplink transmission scheme of a 3GPP LTE system, and is equivalently referred to as SC-FDMA.

Also, in 3GPP LTE-advanced, DFT-S-OFDM was considered an uplink transmission scheme and determined in early 2009 to be modified and applied as a clustered DFT-S-OFDM scheme, which allows non-contiguous resource allocation according to carrier aggregation considered in LTE-advanced.

Meanwhile, in most communication systems, a reference or pilot signal is transmitted from a transmission end to a reception end according to a predetermined rule in order to estimate a channel of the reception end, and so on. In 3GPP LTE, one OFDM symbol is used per slot to transmit a reference signal. This is intended to prevent a CM and PAPR from increasing due to characteristics of a DFT-S-OFDM signal when one OFDM symbol (which means a DFT-S-OFDM symbol but will be referred to as an OFDM symbol for convenience herein).

Meanwhile, LTE-advanced should provide a basic communication service even in a higher frequency spectrum and at a higher mobile velocity than LTE. For example, LTE-advanced requires support for a high mobile velocity of 350 km/h (even up to 500 km/h), which is the same as the velocity of a bullet train.

For this reason, LTE-advanced results in a higher Doppler spread environment than that considered in an LTE system, and it is difficult for the RS structure of a conventional LTE system to have satisfactory performance. To be specific, in the case of LTE, a length of each OFDM symbol is 66.67 μs, which is sufficiently shorter than a channel coherence time in a general environment. However, when a Doppler frequency caused by a high mobile velocity and a high frequency spectrum of a terminal, which are intended by LTE-advanced, is high, a fading channel may drastically vary even in one slot period (0.5 ms).

In addition, the current specification of LTE specifies only uplink DM-RS transmission in single-layer transceiving, and does not propose an uplink multi-layer (spatial multiplexing) transmission method to be introduced in LTE-advanced.

SUMMARY

Accordingly, example embodiments of the present invention are provided to substantially obviate one or more problems due to limitations and disadvantages of the related art.

Example embodiments of the present invention provide a method of transmitting an uplink demodulation reference signal (DM-RS) multiplexed with data in uplink multiple-input multiple-output (MIMO) transmission whereby a high mobile velocity of a terminal is supported according to requirements of long term evolution (LTE)-advanced, and uplink MIMO multi-layer transmission can be supported.

In some example embodiments, a multi-layer transmission method of multiplexing and transmitting data and a DM-RS sequence in an uplink digital Fourier transform-spread-orthogonal frequency division multiplexing (DFT-S-OFDM) transmission employing MIMO includes: allocating one DM-RS sequence as a DM-RS sequence of a first transmission layer for uplink transmission; allocating a DM-RS sequence whose cyclic shift (CS) value having the same sequence as the DM-RS sequence of the first transmission layer is configured to differ from that of the DM-RS sequence as a DM-RS sequence of a second transmission layer; and multiplexing layer-specific data and the layer-specific DM-RS sequences according to each of the first and second transmission layers.

Multiplexing the layer-specific data and the layer-specific DM-RS sequences may include multiplexing the layer-specific data and the layer-specific DM-RS sequences in a time domain before application of a DFT.

Multiplexing the layer-specific data and the layer-specific DM-RS sequences may include multiplexing the layer-specific data and the layer-specific DM-RS sequences by interleaved frequency division multiplexing (IFDM).

The method may further include including at least two OFDM symbols in which the layer-specific data and the layer-specific DM-RS sequences are multiplexed in each slot and transmitting the slot. Here, the at least two OFDM symbols in which the layer-specific data and the layer-specific DM-RS sequences are multiplexed may be a second OFDM symbol and a sixth OFDM symbol of the slot.

A difference between the CS value of the DM-RS sequence of the first transmission layer and a CS value of the DM-RS sequence of the second transmission layer may be maximized.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the appended drawings.

Figure 1:
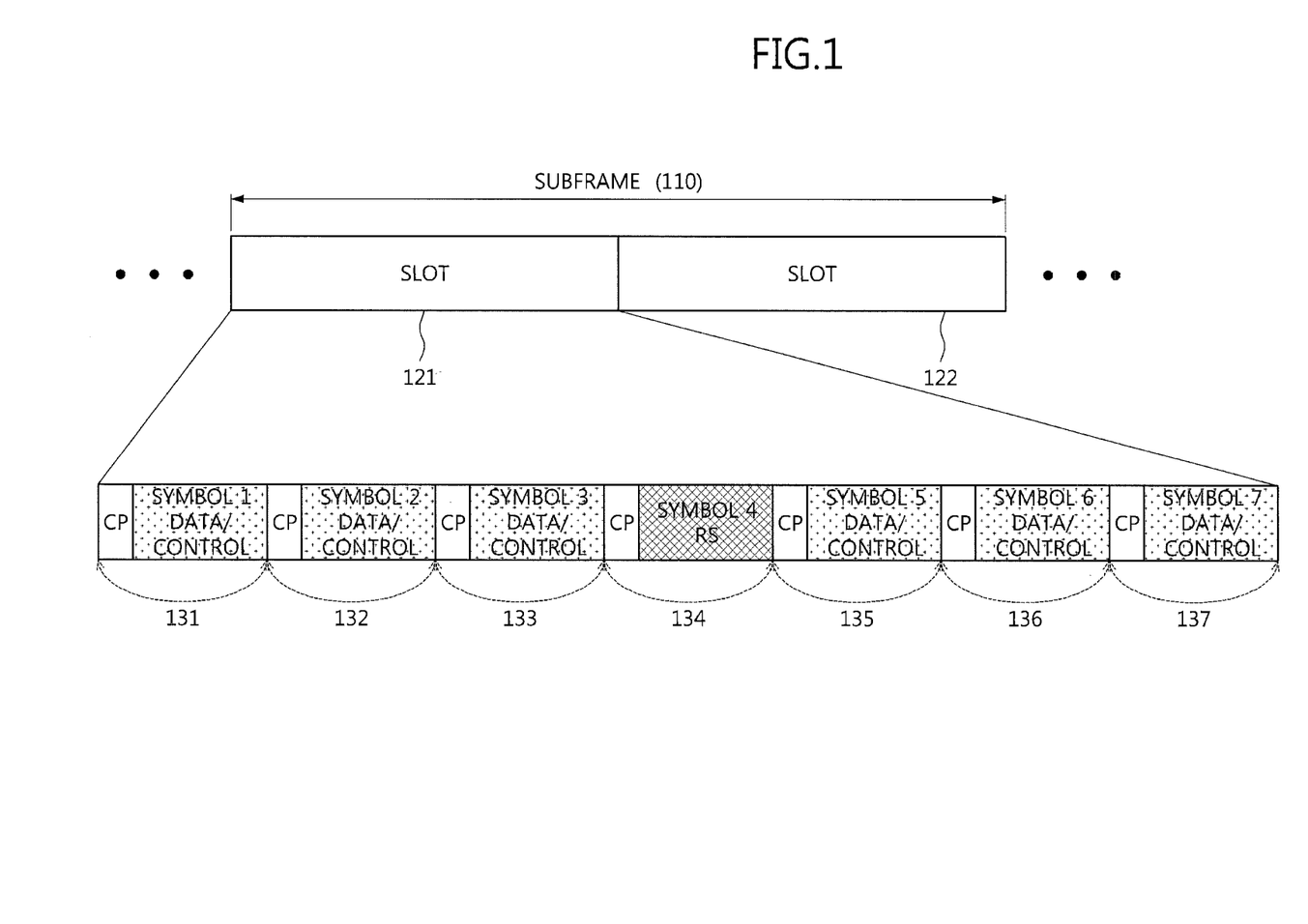
FIG. 1 is a frame diagram illustrating an uplink demodulation reference signal (DM-RS) transmission structure of 3rd Generation Partnership Project (3GPP) long term evolution (LTE)

FIG. 1 is a frame diagram illustrating an uplink DM-RS transmission structure of 3GPP LTE.

Referring to FIG. 1, one subframe 110 includes two slots 121 and 122, and one slot 121 includes OFDM symbols 131 to 137. The number of OFDM symbols in one slot may vary according to whether or not a normal cyclic prefix (CP) and an extended CP are used, whether or not there is a sounding reference signal (SRS), and so on. It can be seen that a DM-RS symbol is positioned at a middle OFDM symbol (i.e., a fourth OFDM symbol) in each slot.

For convenience, FIG. 1 shows an example of a slot structure employing a normal CP and consisting of seven OFDM symbols, which means a case in which there is no SRS. When an extended CP is used, one slot consists of six OFDM symbols, and a third OFDM symbol is a DM-RS symbol in each slot.

For this reason, LTE-advanced results in a higher Doppler spread environment than that considered in an LTE system, and it is difficult for the RS structure of a conventional LTE system to have satisfactory performance. To be specific, in the case of LTE, a length of each OFDM symbol is 66.67 μs, which is sufficiently shorter than a channel coherence time in a general environment. However, when a Doppler frequency caused by a high mobile velocity and a high frequency spectrum of a terminal, which are intended by LTE-advanced, is high, a fading channel may drastically vary even in one slot period (0.5 ms).

To solve this problem, the frequency of RSs per slot should be increased in a time axis.

As a simple method of increasing RSs in a time domain, the number of OFDM symbols for transmitting RSs in each slot may be increased. For example, a DM-RS is not transmitted using one OFDM symbol per slot, but is positioned in two OFDM symbols per slot and transmitted. This method ensures improvement in channel estimation performance. However, overhead caused by an RS doubles, resulting in a significant reduction in a data transmission rate.

To solve this problem, an RS and data are multiplexed in one OFDM symbol and transmitted.

In this case, a ratio of a portion of the one OFDM symbol occupied by the RS to the whole OFDM symbol decreases. Thus, even if an RS is multiplexed with data in a plurality of symbols in one slot, it is possible to prevent an increase in overhead caused by the RS.

To multiplex data and an RS in one OFDM symbol, code division multiplexing (CDM), FDM, time division multiplexing (TDM), etc. may be used.

First, the CDM scheme generally has problems of an increase in CM, interference of an RS, etc., and thus is difficult to use.

Next, in an example of the FDM scheme, an RS and data/control information are multiplexed by interleaved FDM (IFDM) in an OFDM symbol. For example, data/control information having undergone DFT spreading is sequentially input to one of every two subcarriers by a resource mapper, and an RS is inserted in empty subcarriers between the subcarriers to which the data/control information is input.

Finally, in the TDM scheme, data and an RS may be multiplexed in a time domain before a DFT during a process of generating a DFT-S-OFDM signal.

In other words, data and an RS are multiplexed in a time domain before a DFT. Since the data and the RS are spread together by a DFT, an increase in CM can be prevented.

Here, a transmission signal should be configured so that respective CPs for a multiplexed data area and RS area can be present in one OFDM symbol. Thus, overhead caused by the CPs increases, but is less than that of a case in which a DM-RS is transmitted using all OFDM symbols in one slot.

As the above-described TDM scheme, a method of multiplexing data and an RS in a time domain before a DFT during a process of generating a DFT-S-OFDM signal has been disclosed in a preceding paper (R1-091472 of Qualcomm submitted to 3GPP TSG-RAN WG #56bis meeting). However, the paper specifies only uplink DM-RS transmission in single-layer transceiving, and does not propose an uplink multi-layer (spatial multiplexing) transmission method to be introduced in LTE-advanced.

Figure 2:
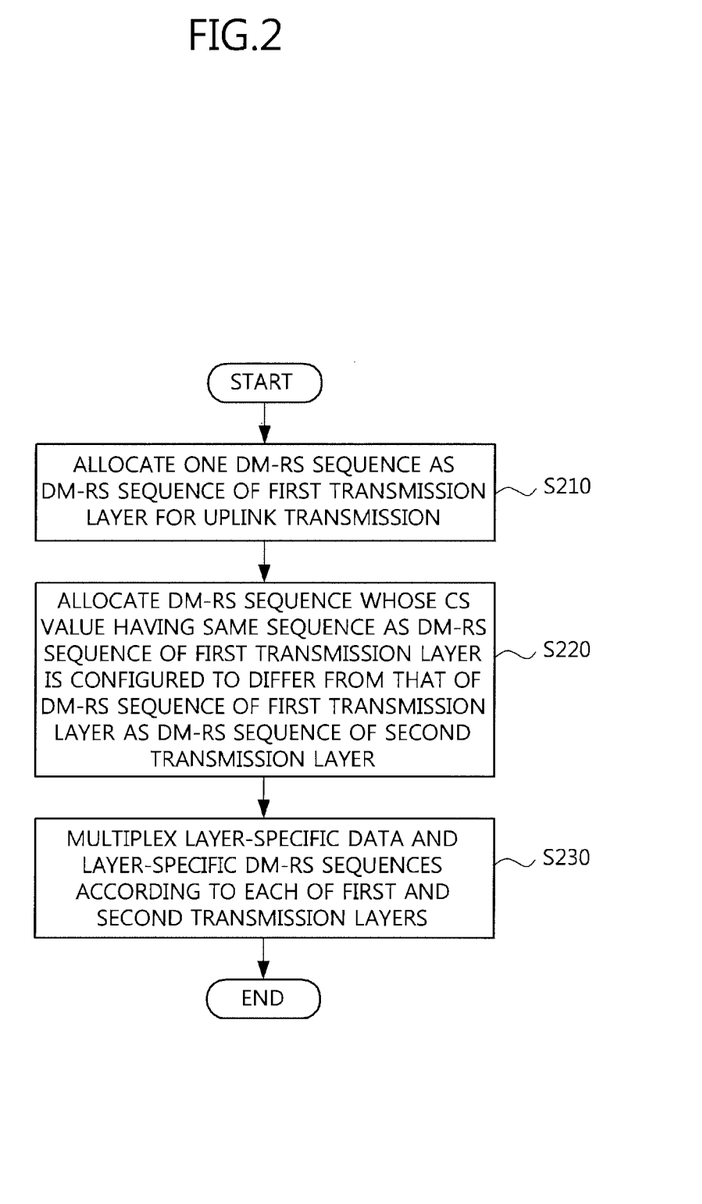
FIG. 2 is a flowchart illustrating a multi-layer transmission method of multiplexing and transmitting data and a DM-RS sequence according to example embodiments of the present invention in an uplink digital Fourier transform-spread-orthogonal frequency division multiplexing (DFT-S-OFDM) transmission scheme employing multiple-input multiple-output (MIMO)

Method of Multiplexing and Transmitting DM-RS in Multi-Layer Transmission According to Example Embodiments of Present Invention FIG. 2 is a flowchart illustrating a multi-layer transmission method of multiplexing and transmitting data and a demodulation reference signal (DM-RS) sequence according to example embodiments of the present invention in an uplink digital Fourier transform-spread-orthogonal frequency division multiplexing (DFT-S-OFDM) transmission scheme employing multiple-input multiple-output (MIMO).

Referring to FIG. 2, a multi-layer transmission method of multiplexing and transmitting data and a DM-RS sequence in an uplink DFT-S-OFDM transmission scheme employing MIMO according to example embodiments of the present invention includes allocating one DM-RS sequence as a DM-RS sequence of a first transmission layer for uplink transmission (S210), allocating a DM-RS sequence whose cyclic shift (CS) value having the same sequence as the DM-RS sequence of the first transmission layer is configured to differ from that of the DM-RS sequence as a DM-RS sequence of a second transmission layer (S220), and multiplexing layer-specific data and the layer-specific DM-RS sequences according to each of the first and second transmission layers (S230).

Here, the multi-layer transmission method of multiplexing and transmitting data and a DM-RS sequence in an uplink DFT-S-OFDM transmission scheme employing MIMO according to example embodiments of the present invention can be applied to transmission in two layers (a first layer and a second layer) and also to transmission in up to four layers, which is taken into consideration in uplink transmission of long term evolution (LTE)-advanced. In the future, the multi-layer transmission method can also be applied to transmission in four or more layers.

In the step of allocating one DM-RS sequence for uplink transmission (S210), an uplink DM-RS sequence allocation method of conventional LTE can be used as it is.

To be specific, a DM-RS sequence is generated from a constant amplitude zero autocorrelation (CAZAC) sequence. The length of the generated DM-RS sequence is the same as the number of subcarriers corresponding to the number of resource blocks (RBs) to which a DM-RS is allocated (one RB corresponds to 12 subcarriers in terms of frequency).

When the length of a whole DM-RS to be generated is 3 RBs or more, a DM-RS sequence is generated from an extended Zadoff-Chu (ZC) sequence, which is a kind of CAZAC sequence. On the other hand, when the length of the DM-RS to be generated is less than 3 RBs, a DM-RS sequence can be generated using a computer-generated (CG)-CAZAC sequence.

There are 30 base sequence groups of a CAZAC sequence for generating a DM-RS, and one or two base sequences are present in each group according to an available DM-RS length. When the DM-RS length is 5 RBs or less, one base sequence is present in each group according to the DM-RS length. On the other hand, when the DM-RS length is greater than 5 RBs, two base sequences are present in each group according to the DM-RS length. A base sequence used to generate DM-RSs by terminals in one cell is present in one of the base sequence groups.

Subsequently, in step 220, the same sequence as the DM-RS sequence allocated to first transmission layer in step 210 is configured to have a different cyclic shift (CS) value than the DM-RS sequence and allocated as a DM-RS sequence of a second transmission layer.

In other words, in example embodiments of the present invention, respective layers have different CSs to maintain orthogonality for distinguishing antenna-specific DM-RSs from each other when one terminal performs multi-layer transmission.

At this time, a difference between CS values of layer-specific DM-RS sequences may be maximized to increase orthogonality of layer-specific DM-RSs.

Subsequently, in step 230, layer-specific data and the layer-specific DM-RS sequences are multiplexed according to each of the first and second transmission layers.

As a method of generating an OFDM symbol in which the layer-specific data and the layer-specific DM-RS sequences are multiplexed according to example embodiments, the layer-specific data and the layer-specific DM-RS sequences can be multiplexed in a time domain before a DFT, or the layer-specific data and the layer-specific DM-RS sequences can be multiplexed in a frequency domain after a DFT by interleaved frequency division multiplexing (IFDM). These methods will be described later.

Finally, at least two OFDM symbols in which the layer-specific data and the layer-specific DM-RS sequences are multiplexed may be included in each slot and transmitted.

Figure 3:
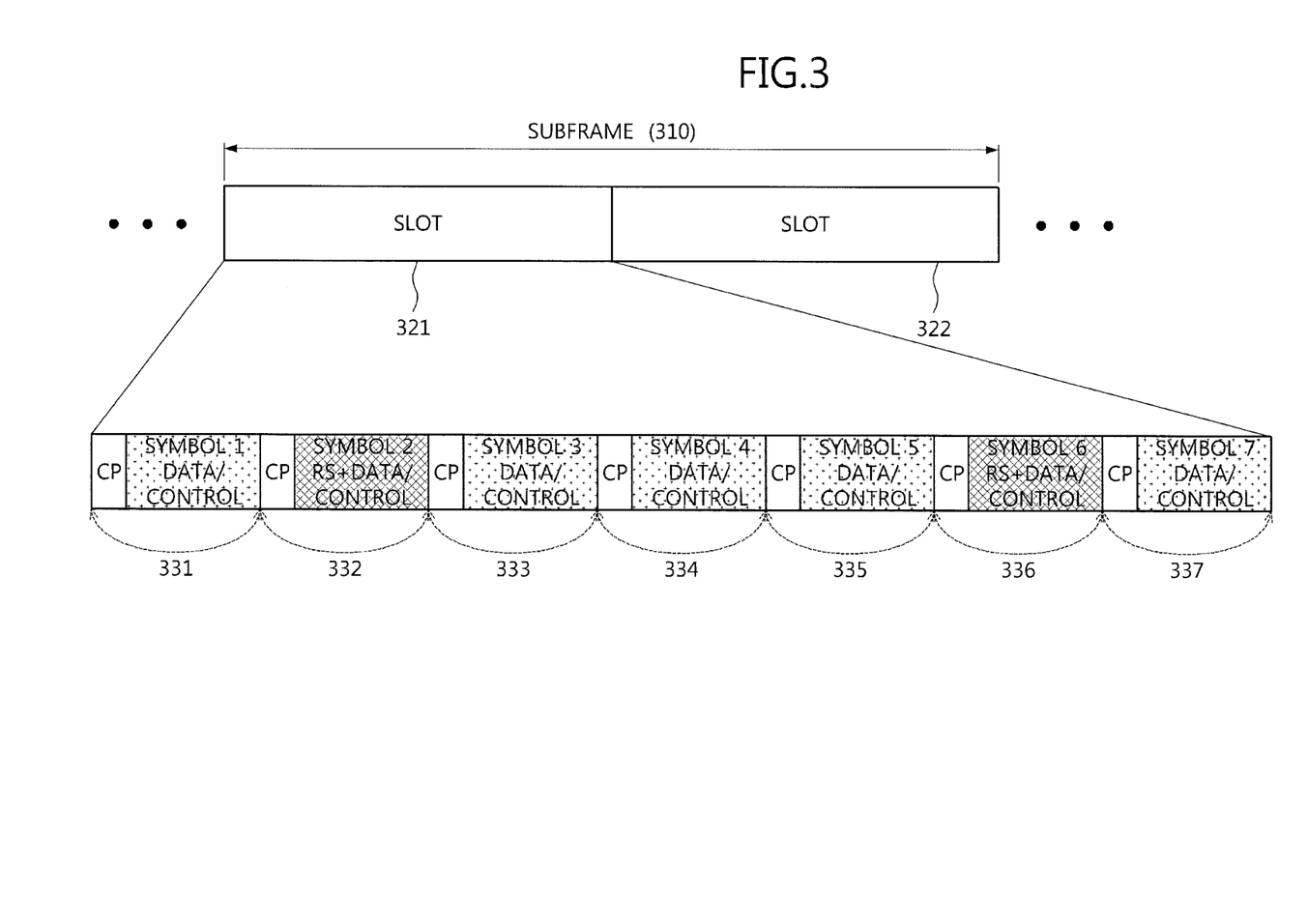
FIG. 3 is a frame diagram illustrating a constitution of an OFDM symbol of each slot in which data and an RS are multiplexed according to example embodiments of the present invention.

FIG. 3 is a frame diagram illustrating a constitution of an OFDM symbol of each slot in which data and an RS are multiplexed according to example embodiments of the present invention.

In comparison with the frame diagram of FIG. 1 illustrating an uplink DM-RS transmission structure of conventional 3rd Generation Partnership Project (3GPP) LTE, a ratio of a portion of one OFDM symbol occupied by an RS to the whole OFDM symbol remarkably decreases in the frame diagram of FIG. 3 according to example embodiments of the present invention, and the RS can be transmitted in more OFDM symbols of a slot or subframe without an increase in overhead caused by the RS. For example, data/control information and an RS can be multiplexed and transmitted in second and sixth OFDM symbols 332 and 336 of one slot.

Method of Multiplexing Data and DM-RS Sequence in One OFDM Symbol

1) Example Embodiment #1 (IFDM)

In example embodiment #2 to be described later, data/control information and a DM-RS sequence are multiplexed before an M-point DFT and spread together during the M-point DFT. On the other hand, a method of multiplexing data and an RS according to an IFDM structure in which a cubic metric (CM) does not significantly increase and also channel estimation performance can be improved when data and an RS are mixed by FDM is enabled in an example embodiment. The latter example embodiment will be described first.

Such a method of multiplexing data and an RS by IFDM is included in Korean Patent Application No. 2009-0052208 filed by the present applicant, and will be described herein.

Figure 4:
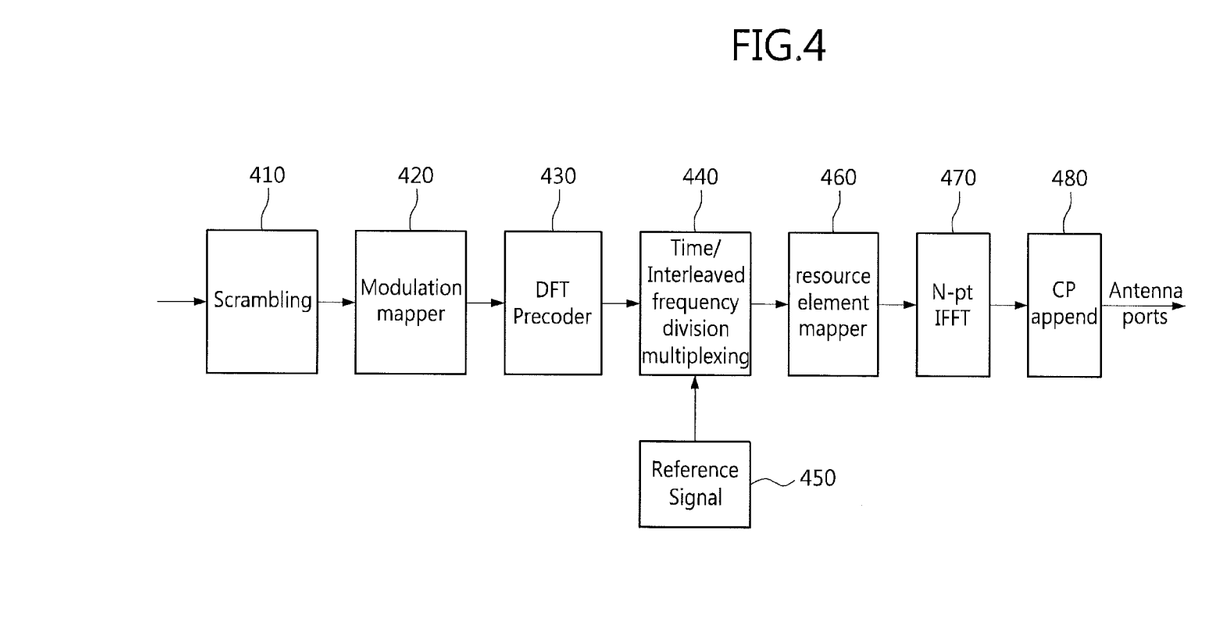
FIG. 4 is a block diagram illustrating an uplink transmission function of multiplexing data and an RS according to other example embodiments of the present invention.

FIG. 4 is a block diagram illustrating an uplink transmission function of multiplexing data and an RS according to other example embodiments of the present invention.

Referring to FIG. 4, an uplink transmitter may include a scrambling 410, a modulation mapper 420, a DFT precoder 430, a time/interleaved frequency division multiplexing 440, an RS generator 450, a resource element (RE) mapper 460, an N-point inverse fast Fourier transform (IFFT) 470, and a CP appender 480.

First, the scrambling 410 scrambles an input bit stream, which is encoded and interleaved by a convolutional interleaver, a turbo interleaver, a low-density parity check (LDPC) encoder, etc., using a scrambling bit string having the same length as the input bit stream. Here, a scrambling sequence generally includes user-specific identification information.

The modulation mapper 420 performs quadratic phase shift modulation (QPSK) or quadratic amplitude modulation (QAM) on the scrambled bit stream to generate a complex symbol stream.

The DFT precoder 430 sequentially receives input complex symbols corresponding to a predetermined DFT size and performs a DFT. Here, when DFT spreading is performed on both of data/control information and an RS, an M-point DFT is applied to the DFT precoder 430. However, in example embodiment #1, an RS and data/control information should be mixed to constitute an OFDM symbol, and thus the DFT precoder 430 may receive M/2 QPSK or QAM input complex symbols and perform an M/2-point DFT. Alternatively, the DFT precoder 430 may perform an M-point DFT after inserting 0 between the M/2 input complex symbols.

The time/interleaved frequency division multiplexing 440 multiplexes OFDM symbols consisting of data/control information (e.g., symbols 331, 333, 334, 335 and 337 of FIG. 3) and OFDM symbols including an RS (e.g., the symbols 332 and 336 of FIG. 3) by time division multiplexing (TDM), and multiplexes the RS and the data/control information by IFDM in an OFDM symbol.

In other words, the data/control information is sequentially input to one of every two parallel input terminals of the RE mapper 460, and the RS is input into the empty parallel input terminals between the parallel input terminals, to which the data/control information is input, and multiplexed.

Functions of the function blocks 430 to 470 when an OFDM symbol in which IFDM is performed on the RS and the data/control information is generated will be described later with reference to FIG. 5.

The RS generator 450 generates the RS consisting of a signal sequence, which is appropriate for channel estimation and has an excellent CM characteristic, as a predetermined signal sequence transmitted for estimating a channel of a reception end, etc., and provides the generated RS to the time/interleaved frequency division multiplexing 440.

As mentioned above, the RE mapper 460 receives a signal sequence output from the time/interleaved frequency division multiplexing 440 and maps the signal sequence to the position of an allocated subcarrier.

The N-point IFFT 470 performs an IFFT with a predetermined size of N, and the CP appender 480 appends a CP having an appropriate length and transmits a signal through the corresponding transmission antenna port.

Figure 5:
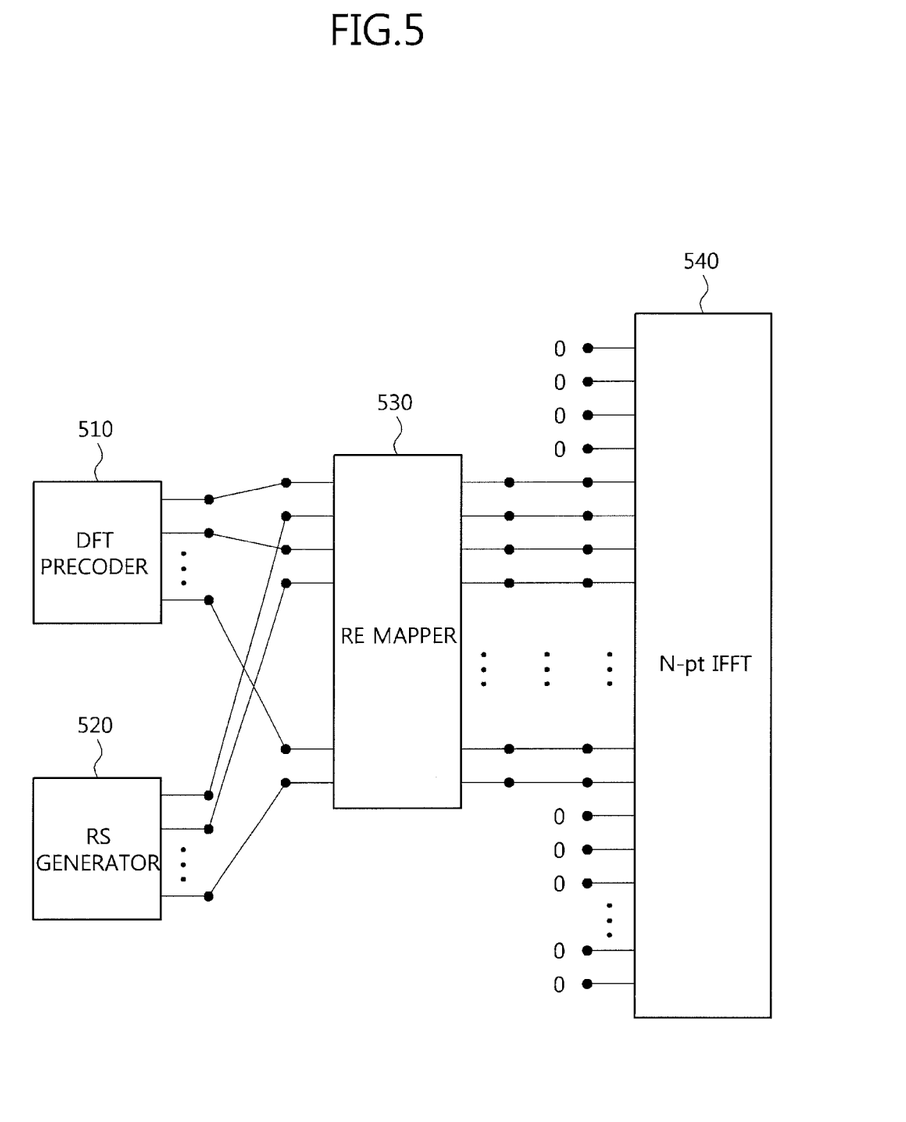
FIG. 5 is a block diagram illustrating functions of function blocks when an OFDM symbol in which interleaved frequency division multiplexing (IFDM) is performed on an RS and data/control information is generated.

FIG. 5 is a block diagram illustrating functions of function blocks when an OFDM symbol in which IFDM is performed on an RS and data/control information is generated.

Referring to FIG. 5, a complex symbol stream output from a DFT precoder 510 (430 in FIG. 4) and a symbol stream output from an RS generator 520 (450 in FIG. 4) are alternately input to input terminals of an RE mapper 530 (460 in FIG. 4), mapped to predetermined and allocated M subcarrier positions, and converted by an N-point IFFT 540 (470 in FIG. 4). Thereafter, a CP is added to the converted symbol streams to constitute an OFDM symbol.

Here, the symbol stream output from the DFT precoder 510 may be mapped to odd-numbered input terminals of the RE mapper 530 and the symbol stream output from the RS generator 520 may be mapped to even-numbered input terminals, or vice versa. These mapping sequences may be alternately changed for every OFDM symbol configured by IFDM, or alternatively changed for every slot.

In the multiplexing method of example embodiment #1, an RS is multiplexed with data/control information in one OFDM symbol, and thus a CM slightly increases. However, due to IFDM, one single carrier signal and an RS having an excellent CM characteristic overlap each other in a time domain, and thus the CM does not increase significantly. In other words, the density of the RS in a time domain of a slot or subframe increases with no significant increase in the CM. Thus, in a user channel having high mobility, it is possible to expect performance superior to a 3GPP LTE uplink system.

2) Example Embodiment #2 (TDM)

A method of multiplexing data and a DM-RS sequence in one OFDM symbol of each layer can be described according to example embodiment #2. Meanwhile, the following method of multiplexing data and a DM-RS sequence is based on the paper (R1-091472) announced by Qualcomm at the conference 3GPP LTE RAN TSG WG1 #56bis.

Figure 6:
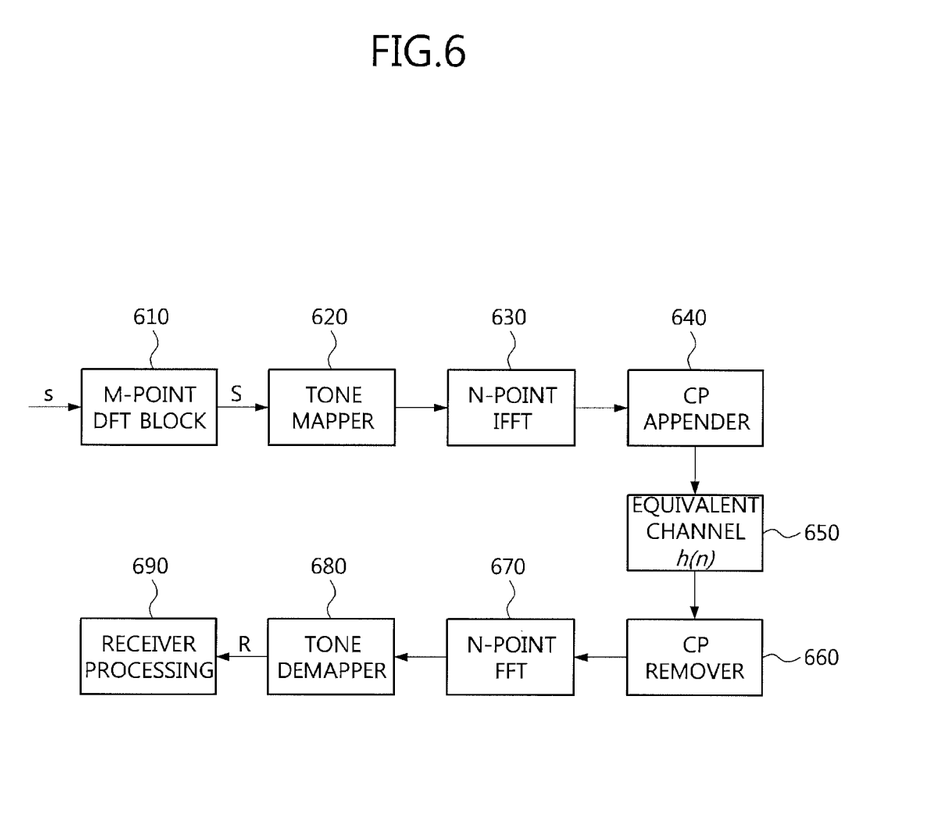
FIG. 6 is a block diagram of main function blocks of an uplink communication system (for transmission and reception) of LTE-advanced.

FIG. 6 is a block diagram of main function blocks of an uplink communication system (for transmission and reception) of LTE-advanced.

Referring to FIG. 6, an uplink communication system of LTE-advanced includes a transmitter (i.e., a terminal side) having an M-point DFT block 610, a tone mapper 620 which allocates a frequency-domain signal spread by the M-point DFT block 610 to respective subcarriers, an N-point IFFT 630 which converts the tone-mapped frequency-domain signal into a time-domain signal, and a CP appender 640 which inserts a CP (a power amplifier (PA) and antenna of the transmitter side are not shown).

A signal output from the transmitter is transferred to a receiver via an equivalent channel 650.

The receiver has a CP remover 660 which removes a CP of the receiver side, an N-point FFT 670 which converts a time-domain signal into a frequency-domain signal, a tone demapper 680 which performs demapping according to subcarriers, and a receiver processing 690.

Major reference signs shown in FIG. 6 are defined as follows.

s: a transmission vector including M modulation symbols (e.g., QAM symbols) and having a size of M S: a signal obtained when s is spread in a frequency domain by an M-point DFT h(n): a discrete-time equivalent channel characteristic between a transmitter antenna and a receiver antenna R: a reception signal FFTed to a frequency domain Assuming that M subcarriers 0 to M−1 are used, a reception signal of a k-th subcarrier can be expressed by Equation 1 below.

$$R = \text{Diag}\{H(k), k=0, \ldots, M-1\} \cdot S + W \qquad \text{[Equation 1]}$$

Here, $$H(k) = DFT\{h(n)\} = \sum_{n=0}^{L-1} h(n) e^{-j\frac{2\pi kn}{N}}.$$

In other words, H(k) denotes a channel characteristic of a frequency domain in which a DFT is performed on h(n) (where L denotes the number of taps of a channel, and W denotes an M-by-1 noise vector).

Thus, when an M-point inverse discrete Fourier transform (IDFT) is performed in the receiver processing 690, a time-domain receiver signal is expressed by Equation 2 below using an M-by-1 R vector of a frequency domain.

$$r(n) = \text{IDFT}\{H(k), k=0, \ldots, M-1\} \otimes_M s(n) + w(n) \qquad \text{[Equation 2]}$$

Here, $\otimes_M$ denotes an M-point circular convolution.

When $\tilde{h}(n)$ is defined as $\{\tilde{h}(n), n=0, \ldots, M-1\} = \text{IDFT}\{H(k), k=0, \ldots, M-1\}$, the number L of taps having a substantial energy of $\{\tilde{h}(n)\}_{n=0}^{M-1}$ can be approximated using $\upsilon = LM/N$.

Thus, when the transmission signal s of a time domain before an M-point DFT of the transmitter is configured by Equation 3 below, a reception signal of a time domain can be expressed by Equation 4 below.

$$s = \begin{bmatrix} \underbrace{a(Q_1-P_1), \ldots, a(Q_1-1)}_{P_1 \text{ Points}}, \underbrace{a(0), \ldots, a(Q_1-1)}_{Q_1 \text{ Points}}, \\ \underbrace{a(0), \ldots, a(P_2-1)}_{P_2 \text{ Points}}, \underbrace{b(Q_2-P_1), \ldots, b(Q_2-1)}_{P_1 \text{ Points}}, \\ \underbrace{b(0), \ldots, b(Q_2-1)}_{Q_2 \text{ Points}}, \underbrace{b(0), \ldots, b(P_2-1)}_{P_2 \text{ Points}} \end{bmatrix}^T \qquad \text{[Equation 3]}$$

where
$2(Q_1 + Q_2 + P_1 + P_2) = M$ $$r_1 = [r(P_1), r(P_1+1), \ldots, r(P_1+Q_1-1)]^T \qquad \text{[Equation 4]}$$

$$r_2 = \begin{bmatrix} r(2P_1+P_2+Q_1), r(2P_1+P_2+Q_1+1), \ldots, \\ r(2P_1+P_2+Q_1+Q_2-1) \end{bmatrix}^T$$

In other words, when $P_1$ whereby a length of a CP for a DM-RS sequence is determined and $P_2$ whereby a length of a CP for data is determined are selected to be $P_1 + P_2 \geq \upsilon$, Equations 5 and 6 below can be obtained.

$$r_1(n) = \tilde{h}_1(n) \otimes_{Q_1} a(n) + w_1(n) \qquad \text{[Equation 5]}$$

$$r_2(n) = \tilde{h}_2(n) \otimes_{Q_2} b(n) + w_2(n) \qquad \text{[Equation 6]}$$

When a DFT is performed on the both sides of Equations 5 and 6, Equations 7 and 8 below can be obtained.

$$R_1(k) = H_1(k)A(k) + W_1(k), k=0,1,\ldots,Q_1-1 \qquad \text{[Equation 7]}$$

$$R_2(k) = H_2(k)B(k) + W_2(k), k=0,1,\ldots,Q_2-1$$

where $H_1(k) = \text{DFT}\{\tilde{h}_1(n)\}$, $H_2(k) = \text{DFT}\{\tilde{h}_2(n)\}$, $A(k) = \text{DFT}\{a(n)\}$, and $B(k) = \text{DFT}\{b(n)\}$ Thus, a $Q_1$ point sequence $\{a(n)\}$ becomes a DM-RS sequence, and a $Q_2$ point sequence $\{b(n)\}$ is multiplexed as data. In other words, data and a DM-RS sequence can be appropriately multiplexed in the signal s of the time domain before DFT spreading without deteriorating a single carrier characteristic.

In a 3GPP LTE system, an RS is configured in units of one OFDM symbol for transmission. On the other hand, when the above-described method of transmitting an uplink DM-RS according to example embodiments of the present invention is used, a ratio of a portion of one OFDM symbol occupied by the RS to the whole OFDM symbol remarkably decreases. Thus, the RS can be transmitted in more OFDM symbols of a slot or subframe without an increase in overhead caused by the RS, and it is possible to satisfy requirements of LTE-advanced that a higher frequency spectrum and a higher mobile velocity than those of LTE should be supported.

Also, since it is possible to transmit and receive a DM-RS multiplexed with data while maintaining orthogonality even in uplink multi-layer transmission, the DM-RS can be separated according to antennas.

While the example embodiments of the present invention and their advantages have been described in detail, it should be understood that various changes, substitutions and alterations may be made herein without departing from the scope of the invention.

What is claimed is:

1. A multi-layer transmission method of multiplexing and transmitting data and a demodulation reference signal (DM-RS) sequence in an uplink digital Fourier transform-spread orthogonal frequency division multiplexing (DFT-S-OFDM) transmission employing multiple input multiple-output (MIMO), the method comprising:
    allocating a first DM-RS sequence as a DM-RS sequence of a first transmission layer;
    allocating a second DM-RS sequence as a DM-RS sequence of a second transmission layer;
    generating a first layer OFDM symbol in which the first DM-RS sequence and data of the first transmission layer are multiplexed;
    generating a second layer OFDM symbol in which the second DM-RS sequence and data of the second transmission layer are multiplexed;
    including at least two OFDM symbols in which a layer-specific data and a layer-specific DM-RS sequences are multiplexed in each slot and transmitting the slot, wherein the at least two OFDM symbols in which the layer-specific data and the layer-specific DM-RS sequences are multiplexed are a second OFDM symbol and a sixth OFDM symbol of the slot; and
    transmitting the first layer OFDM symbol by using the first transmission layer and the second layer OFDM symbol by using the second transmission layer to a base-station, wherein the first DM-RS sequence has the same sequence as the second DM-RS sequence, and a cyclic shift (CS) value of the first DM-RS sequence is configured to differ from a CS value of the second DM-RS sequence.

2. The method of claim 1, wherein the first DM-RS sequence and the data of the first transmission layer are multiplexed in a time domain before application of a DFT and The second DM-RS sequence and the data of the second transmission layer are multiplexed in a time domain before application of a DFT.

3. The method of claim 1, wherein the first DM-RS sequence and the data of the first transmission layer are multiplexed by interleaved frequency division multiplexing (IFDM) and The second DM-RS sequence and the data of the second transmission layer are multiplexed by interleaved frequency division multiplexing (IFDM).

4. The method of claim 1, wherein a difference between the CS value of the first DM-RS sequence and a CS value of the second DM-RS sequence is maximized.

* * * * *

UNITED STATES PATENT AND TRADEMARK OFFICE
CERTIFICATE OF CORRECTION

PATENT NO. : 8,718,168 B2  
APPLICATION NO. : 13/010426  
DATED : May 6, 2014  
INVENTOR(S) : Byung Jang Jeong et al.

Page 1 of 1

It is certified that error appears in the above-identified patent and that said Letters Patent is hereby corrected as shown below:

On the title page please insert

Item --(30)   Foreign Application Priority Data

Jan. 20, 2010 (KR) ............ 10-2010-0005014
Jan. 11, 2011 (KR) ............ 10-2011-0002634--

Signed and Sealed this
Fourteenth Day of June, 2016

Michelle K. Lee
*Director of the United States Patent and Trademark Office*